(12) United States Patent
Inagaki et al.

(10) Patent No.: US 6,380,705 B1
(45) Date of Patent: Apr. 30, 2002

(54) CHOPPING ENERGIZATION CONTROL DEVICE

(75) Inventors: Hiroyuki Inagaki; Masanori Sugiyama; Daisuke Yamada; Chiaki Honma; Yoshihide Suzuki, all of Aichi-ken (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 09/649,096

(22) Filed: Aug. 28, 2000

(30) Foreign Application Priority Data

Aug. 26, 1999 (JP) .......................................... 11-240421

(51) Int. Cl.⁷ ................................................. H02P 7/05
(52) U.S. Cl. ........................ 318/293; 318/432; 318/701
(58) Field of Search ................................. 318/254, 280, 318/287, 291, 293, 432, 433, 439, 700, 701, 721; 363/95, 98

(56) References Cited

U.S. PATENT DOCUMENTS 5,959,419 A * 9/1999 Sugiyama .................... 318/293
5,999,431 A * 12/1999 Sugiyama .................... 363/95
6,246,193 B1 * 6/2001 Dister .......................... 318/254

FOREIGN PATENT DOCUMENTS

JP   7-274569   10/1995
JP   8-172793   7/1996

* cited by examiner

Primary Examiner—Khanh Dang
(74) Attorney, Agent, or Firm—Sughrue Mion, PLLC

(57) ABSTRACT

In order to make an electric motor smooth in drive with improving the electric consumption efficiency, the over heat of a motor driver and vibrations thereat are restricted which result from chopping energization of the electric motor.

16 Claims, 5 Drawing Sheets

CHOPPING ENERGIZATION CONTROL DEVICE

BACKGROUND OF THE INVENTION

FIELD OF THE INVENTION

The present invention is directed to a chopping energization control device including a switching element interposed between one end of an electric coil of a motor and one terminal of a power supply and another switching element interposed between the other end of the electric coil of the motor and the other terminal of the power supply and energizing the electric coil in chopping mode in such a manner that both of the switching elements are turned on and off (are made to be conductive and nonconductive), the motor is in synchronization, and such operations are repeated. This chopping energization device is used, for example, to energize each of plural phase coils of an SR motor (Switched Reluctance Motor).

For example, an energizing device for SR motor such as an SR motor driver makes switching plural phases (e.g. three phases) or switching energization (ON) of the phase coil (electric coil) and de-energization (OFF) of the phase coil (electric coil). In addition, in order to derive a required torque from the SR motor, ON/OFF control is conducted for maintaining a target current in such a manner that a chopping operation or alternating turn-on and off operation is made on a pair of switching elements allocated to each of the phase coils or an upper sided one of the switching elements. For maintaining or controlling the motor current at the target current amount, some modes have been provided. One of them is soft chopping mode, another is hard chopping mode, and a combination of these modes established depending on motor conditions. These modes are disclosed in detail in Japanese Patent laid-open print No. Hei.8(1996)-172793. The soft chopping mode is to make chopping on one of the pairs of switching elements allocated to each of the phase or electric coils. The hard chopping mode is to turn on and off both of the switching elements in synchronizing fashion.

In addition to the aforementioned soft chopping mode and hard chopping mode, in recent years, compulsory soft chopping mode, frequency reduction mode, and 0V loop soft chopping mode have been provided. The compulsory soft chopping mode is, for the reduction of noise upon switching from one to another the phase coil that is to be energized, to turn on and off one of the switching elements cyclically in compulsion while the other of the switching elements is being turned on in continual fashion. The frequency reduction mode is to lower the chopping frequency so as to prevent overheat of the switching circuit for chopping control or motor driver. The 0V loop soft chopping mode, for raising electric consumption efficiency, is to drive the motor in a very short time of the switching element by the consumption of the electromagnetic at the phase coil which has been stored therein as a result of turning off of upside energizing circuit which is earlier than the ordinal energization off timing.

However, none of these modes are valid throughout all driving stages of the electric motor. For example, lowering the chopping frequency for the protection of the switching circuit from heat generated brings in torqwue variation. The compulsory soft chopping mode is ineffective when the electric motor is in a stage when the energization is made for a very short time or when the current is required to be high in magnitude. In addition, in cases where the 0V loop soft chopping mode is used when the motor is driven to start the electric powered vehicle, if the rotor is resting at an angular position which turns off only the upside energization circuit, no current flows through the electric motor, which results in the motor failing to start.

SUMMARY OF THE INVENTION

It is, therefore, a principal objective of the present invention to provide a chopping energization control device which makes it possible to drive an electric motor in smooth fashion while restricting of a motor drive resulting from chopping energization.

A second objective of the present invention is to provide a chopping energization control device which makes it possible to drive an electric motor in smooth fashion while the chopping noise is reduced.

A third objective of the present invention is to provide a chopping energization control device which makes it possible to drive an electric motor in smooth fashion while the electric power consumption efficiency of the electric motor becomes possible to increase.

In order to attain the foregoing objectives, a first aspect of the present invention provides a chopping energization control device which comprises:

first switching means (18a) interposed between one end of an electric coil (1a, 1b, 1c) of an electric motor (1) and one terminal (18e) of a power supply;

second switching means (18b) interposed between the other end of the electric coil (1a, 1b, 1c) and the other terminal (18f) of the power supply;

signal generation means (11–17) for generating an energization indication signal (S8) which makes the first switching means (18a) and the second switching means (18b) conductive in order to establish a chopping energization of the electric coil (1a, 1b, 1c) at a chopping frequency on the basis of a target driving torque, (Trq) and a rotation number (Nm) of the electric motor (1); and control means (11) for making the chopping frequency smaller when the rotation number, or motor speed value, (Nm) of the electric motor (1) is equal to or less than a predetermined value (w1) than when the rotation number (Nm) of the electric motor (1) is greater than the predetermined value (w1).

It is to be noted that the foregoing reference numerals and reference codes which correspond to those in the drawings and are later described are added in parentheses to facilitate easy understanding of the invention.

In accordance with the first aspect of the present invention as defined above, while the electric motor (1) operates at a low speed, the electric motor (1) is being energized for a longer time and therefore the heat generation at the switching means (18a, 18b) becomes large which are active in chopping energization. However, at this time, the chopping frequency (fc) is lowered, which makes it possible to prevent overheat of the switching means (18, 18b). On the other hand, while the electric motor (1) operates at a high speed, the electric motor (1) is being energized for a shorter time and therefore no over heat occurs at the switching means (18a, 18b) even though the chopping frequency is raised for smoothing the rotation of the electric motor (1).

A second aspect of the present invention provides a chopping energization control device which comprises:

first switching means (18a) interposed between one end of an electric coil (1a, 1b, 1c) of an electric motor (1) and one terminal (18e) of a power supply;

second switching means (18b) interposed between the other end of the electric coil (1a, 1b, 1c) and the other terminal (18f) of the power supply;

signal generation means (11–17) for generating an energization indication signal (S8) which makes the first switching means (18a) and the second switching means (18b) conductive in order to establish a chopping energization of the electric coil (1a, 1b, 1c) on the basis of a target driving torque (Trq) and a rotation number (Nm) of the electric motor (1);

a current sensor (2–4) for detecting an amount of current which flows through the electric coil (1a, 1b, 1c); and control means (11–17) for controlling the electric coil (1a, 1b, 1c) in soft chopping mode and compulsory soft chopping mode if the target driving torque (Trq) becomes larger than a predetermined value (t1) and becomes equal to or smaller than the predetermined value (t1), respectively (Ac region, Cb region), while the electric coil (1a, 1b, 1c) is in its energization period, the soft chopping mode making one of the first switching means (18a) and the second switching means (18b) turned-on when the current amount detected by the current sensor (2) is equal to or less than a target current value corresponding to the target driving torque (Trq), while making the other of the first switching means (18a) and the second switching means (18b) being turned-on in continual fashion, the soft chopping mode making one of the first switching means (18a) and the second switching means (18b) turned-off when the current amount detected by the current sensor (2) is greater than the target current value corresponding to the target driving torque, while making the other of the first switching means (18a) and the second switching means (18b) turned-on in continual fashion, the soft chopping mode making one of the first switching means (18a) and the second switching means (18b) turned-off when the current amount detected by the current sensor (2) is greater than the target current value corresponding to the target driving torque, while making the other of the of the first switching means (18a) and the second switching means (18b) turned-on in continual fashion, the compulsory soft chopping mode repetitively alternating turn-on and turn-off of one of the first switching means (18a) and the second switching means (18b) in compulsory fashion at a cycle (15 KHz) while making the other of the first switching means (18a) and the second switching means (18b) turned-on in continual fashion.

In accordance with the second aspect of the present invention, in the soft chopping mode wherein one of the first switching means (18a) and the second switching means (18b) is brought into on/off chopping state while the other is in continual on state, the current ripple in the electric coil becomes little and torque variation of the electric motor becomes small, which reduce noise and vibrations, respectively. However, one of the first switching means (18a) and the second switching means (18b) under on-off chopping state are brought into electric loss concentrically, thereby becoming an easy condition of over heat. The compulsory soft chopping mode wherein one of the first switching means and the second switching means is compelled to be turned on and off in repeated fashion at a constant cycle of 15 KHz(=66 msec) is effective in noise reduction, but is invalid when energization time is short or high amount of current is required.

In the foregoing structure, the soft chopping mode is made when the electric motor is in high torque required regions, i.e. Ac region and Cb region wherein the target driving torque (Trq) exceeds the set value (t1), which makes it possible to obtain smooth high torque, thereby lowering the vibrations of the electric motor (1). As will be indicated in the seventh aspect, the concentration of electric loss on one of the first switching means (18a) and the second switching means (18b) can be avoided by replacing the same with the other in role at a cycle of time (8 msec). If lower torque is required, i.e. the target torque (Trq) is requested to be equal to or less than the set value (t1) (in Aa region and Ca region), the compulsory chopping mode is made, thereby reducing the noise. Even in the low torque region, the target current value is small, as indicated in the fourth aspect of the present invention. Because the compulsory chopping mode is only allowed in a low speed region (not greater than w2), it is possible to ensure motor drive.

A third aspect of the present invention is to provide a chopping energization control device which comprises:

first switching means (18a) interposed between one end of an electric coil (1a, 1b, 1c) of an electric motor (1) and one terminal (18e) of a power supply;

second switching means (18b) interposed between the other end of the electric coil (1a, 1b, 1c) and the other terminal (18f) bof the power supply;

signal generation means (11–17) for generating an energization indication signal (S8) which makes the first switching means (18a) and the second switching means (18b) conductive in order to establish a chopping energization of the electric coil (1a, 1b. 1c) on the basis of a target driving torque (Trq) and a rotation number (Nm) of the electric motor (1);

a current sensor (2) for detecting an amount of current which flows through the electric coil (1a, 1b, 1c); and control means (11–17) for controlling the electric coil (1a, 1b, 1c) in soft chopping mode and 0V loop soft chopping mode if the rotation number (Nm) of the electric motor (1) is equal to or less than a predetermined value (w2) and is greater than the predetermined value (w2), respectively, the soft chopping mode making, during an energization period of the electric coil, one of the first switching means (18a) and the second switching means (18b) turned-on when the current amount detected by the current sensor (2) is equal to or less than and greater than, respectively, a target current value corresponding to the target driving torque, while making the other of the first switching means (18a) and the second switching means (18b) turned-on in continual fashion, the 0V loop soft chopping mode making one of the first switching means (18a) and the second switching means (18b) turned-on when the current amount detected by the current sensor (2) is equal to or less than and greater than, respectively, the target current value corresponding to the target driving torque (Trq), the turning-off being made before the termination of the energization period of the electric coil (1a, 1b, 1c), while making the other of the first switching means (18a) and the second switching means (18b) turned-on in continual fashion during the energization period of the electric coil (1a, 1b, 1c).

The effect of the soft chopping mode when the rotation number (Nm) is equal to or less than the set value (w2) is similar to that in the second aspect of the present invention. The 0V loop soft chopping is to make the off timing of on-off chopping of one of the first switching means (18a) and the second switching means (18b) earlier when the phase energization time ends, during the remaining time ranging from the off time and the termination of the phase energization time the other switching means is turned on and the electromagnetic energy stored in the electric coil is consumed in the coil. That is to say, a current flows through the coil, which contributes driving the rotor, thereby enabling driving the motor for a short time (short phase switching cycle). Thus, the electric power consumption efficiency of the motor becomes improved. In addition, designs for increasing the number of phase and/or increasing the rotation number of the motor are possible or acceptable. Though making the off timing earlier prevents the starting motor if the rotor stops at an angle which is in coincidence with an off switching angle of the switching means, such a problem fails to occur due to the fact that the 0V loop soft chopping is made if the rotation number (Nm) exceeds the set value (w2) (in Ac region and Cc region).

A fourth aspect of the present invention is to provide a chopping energization control device which comprises:

first switching means (18a) interposed between one end of an electric coil (1a, 1b, 1c) of an electric motor (1) and one terminal (18e) of a power supply;

second switching means (18b) interposed between the other end of the electric coil (1a, 1b, 1c) and the other terminal (18f) of the power supply;

signal generation means (11–17) for generating an energization indication signal (S8) which makes the first switching means (18a) and the second switching means (18b) conductive in order to establish a chopping energization of the electric coil (1a, 1b, 1c) on the basis of a target driving torque (trq) and a rotation number (Nm) of the electric motor (1);

a current sensor (2) for detecting an amount of current which flows through the electric coil (1a, 1b, 1c) and control means (11–17) for controlling the electric coil (1a, 1b, 1c) in soft chopping mode, compulsory chopping mode, and 0V loop soft chopping mode if the rotation number (Nm) of the motor (1) is equal to or less than a set value (w2) and the target driving torque exceeds a predetermined value (t1) while the electric coil (1a, 1b, 1c) is in its energizing period, if the rotation number (Nm) of the motor (1) is equal to or less than the set value (w2) and the target driving torque is equal to or less than the predetermined value (t1) while the electric coil (1a, 1b, 1c) is in its energizing period, and if the rotation number (Nm) of the motor (1) is greater than the set value (w2), respectively, the soft chopping mode making one of the first switching means (18a) and the second switching means (18b) turned-on when a value of current detected by the current sensor (2) is equal to or less than a target current value corresponding to the target driving torque, the soft chopping mode making one of the first switching means (18a) and the second switching means (18b) turned-off when the value of current detected by the current sensor (2) is greater than the target current value, the soft chopping mode making the other of the first switching means (18a) and the second switching means (18b) turned-on in continual fashion, the compulsory soft chopping mode making one of the first switching means (18a) and the second switching means (18b) turned-on when the value of current detected by the current sensor (2) is equal to or less than the set value, the compulsory soft chopping mode making one of the first switching means (18a) and the second switching means (18b) turned-off when a set time (1 µs) elapses after the value of current detected by the current sensor (2) becomes greater than the set value, the compulsory soft chopping mode making the other of the first switching means and the second switching means turned-on in continual fashion, the 0V loop soft chopping mode making one of the first switching means (18a) and the second switching means (18b) turned-on when the value of current detected by the current sensor (2) is equal to or less than the target current value, the 0V loop soft chopping mode making one of the first switching means (18a) and the second switching means (18b) turned-off prior to the energizing period of the electric coil (1a, 1b, 1c) when the value of current detected by the current sensor (2) is greater than the target current value, the 0V loop soft chopping mode making the other of the first switching means (18a) and the second switching means (18b) turned-on in continual fashion.

The fourth aspect of the present invention is a combination of the second aspect and the third aspect of the present invention and thus the merits and advantages of both aspects can be obtained as previously mentioned.

A fifth aspect of the present invention is to provide a chopping energization control device defined by the first aspect, the second aspect, the third aspect, and the fourth aspect of the present invention, wherein the control means (11–17), while the electric motor (1) is in regenerating mode under which a polarity of the target torque value (Trq) and a rotational direction of the electric motor (1) differs, the electric coil (1a, 1b, 1c) is controlled in hard chopping mode in such a manner that if the value of current detected by the current sensor (2) is equal to or less than and is greater than the target current value corresponding to the target driving torque (Trq), both of the first switching means (18a) and the second switching means (18b) are concurrently turned on and off, respectively.

In the regenerating condition wherein the polarity of the target driving torque (Trq) is different from the rotational direction of the electric motor e.g. in the structure of the motor driver 18 which is shown in FIG.2, in regretting condition, making both of the switching elements 18a and 18b turned off induces a current in the electric coil 1a and the resulting or induced current is fed to the lines 18e and 18f by way of the respective diodes 18c and 18d (regenerating braking). Under the resultant condition, making the switching element 18a turned on and off, which establishes generating braking wherein the switching element 18a consumes the electric power generated at the electric coil 1a, thereby making it possible to adjust the braking force. However, the switching element 18a generates heat. In the fifth aspect of the present invention, both of the switching elements 18a and 18b are turned on and off, which increases the generating braking effect. In addition, the heat is shared by both switching elements, which means that the individual switching element becomes smaller in heat generation when compared to the generating braking effect.

It is to be noted that if an H-type bridge type motor drive is employed wherein the diodes 18c and 18d are formed into switching elements, in regenerating condition, the braking force can be adjusted by controlling the regenerative electric power with doing hard chopping mode wherein a first pair of switching elements (e.g. 18a and 18b) are turned off, while a second pair of switching elements (e.g. which are replaced with the diodes 18c and 18d).

A sixth aspect of the present invention is to provide a chopping energization control device as defined in the second aspect, the third aspect, the fourth aspect, and the fifth aspect, wherein if the rotation number (Nm) of the electric motor (1) is a value which is equal to or smaller than the set value and is greater than the set value (w2), the control means(11–17) makes the frequency low and high, respectively.

In accordance with the sixth aspect of the present invention, advantages similar to those of the first aspect can be obtained.

A seventh aspect of the present invention is to provide a chopping energization control device as defined in the second aspect, the third aspect, and fourth aspect wherein at a cycle of time (8 msec) the first switching means (18a) is replaced with the second switching means (18b) so as to be turned on and off in alternate fashion while the second switching means (18b) is replaced with the first switching means (18a) so as to be turned on in continual fashion.

The switching means under on-off chopping state is large in electric loss and therefore the resulting heat generation becomes large, while the switching means which, in continual on condition, is small in electric loss and therefore the resultant heat generation becomes small. Thus, making replacement between both switching means establishes heat generation equivalence between both switching means, which makes it possible to avoid that one of the switching means is brought into over heat condition when compared to the other switching means.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which.

DETAILED DESCRIPTION OF THE PRESENT INVENTION

A preferred embodiment of the present invention will be described hereinafter in detail with reference to the accompanying drawings.

Figure 1:
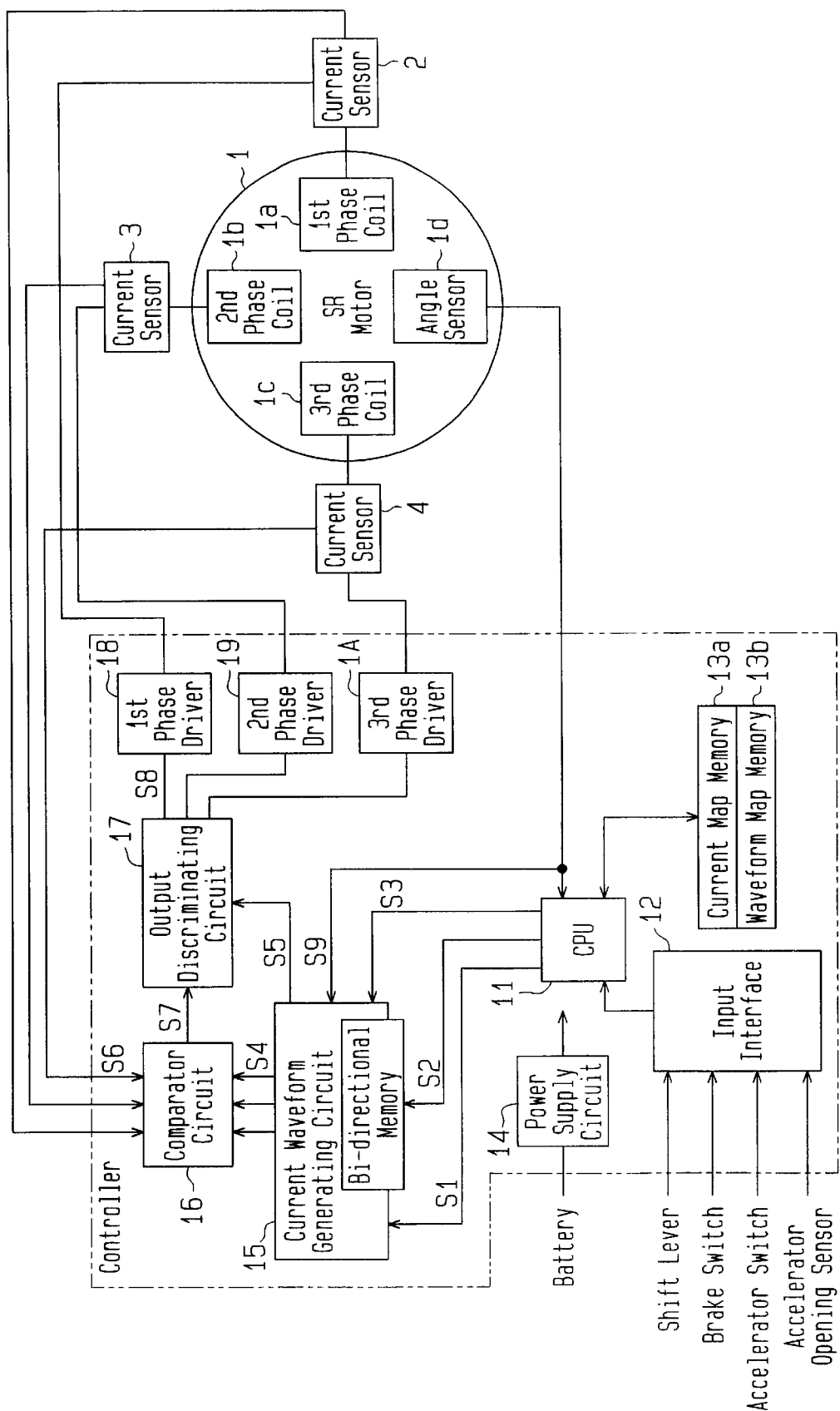
FIG. 1 illustrates a block diagram of an energization control device in accordance with an embodiment of the present invention.

First of all, referring to FIG. 1, there is illustrated a system as one embodiment of the present invention. The system illustrated in FIG. 1 constitutes a main or principal portion of a driving unit of an electric powered vehicle. The exemplary system includes an SR motor 1 (Switched Reluctance Motor) which is under the control of a controller ECU. The controller ECU controls drive of the SR motor 1 on the basis of information inputted from a shift lever, a brake switch, an accelerator switch, and an acceleration opening switch. Electric power is supplied from an on-vehicle battery.

The SR motor 1 is provided, for the driving the same, with three phase coils 1a, 1b, and 1c and an angle sensor 1d for detecting a rotational position or an angular position of a rotor. The three phase coils 1a, 1b, and 1c connected with drivers 18, 19, and 1A within the controller ECU, respectively. Current sensors 2, 3, and 4 are provided on wires which connect the coils 1a, 1b, and 1c with the drivers 18, 19, and 1A, respectively. These current sensors 2, 3, 4 output voltages proportional to currents actually flowing through the coils 1a, 1b, and 1c, as current signals S6 (S6-1, S6-2, S6-3).

The controller ECU is provided therein with a CPU 11 (micro computer or micro processor), an input interface 12, a current map memory 13a, a waveform map memory 13b, a power supply circuit 14, a current waveform generating circuit 15, a comparator circuit 16, an output discriminating circuit 17, and the drivers 18, 19, and 1A. On the basis of information inputted from the shift lever, the brake switch, the accelerator switch, and the acceleration opening switch, the controller ECU calculates continually a required rotational direction, a driving speed, and a driving torque of the SR motor 1.

The controller ECU, based on the results of such calculations, controls currents flowing through the phase coils 1a, 1b, and 1c of the SR motor 1, respectively.

The angle sensor 1d outputs a binary signal of 11 bits which is indicative of an absolute value representing an angle ranging from 0 to 360 degrees. The angle sensor 1d is of 0.35 degrees in minimum resolution of detecting angle.

Figure 2:
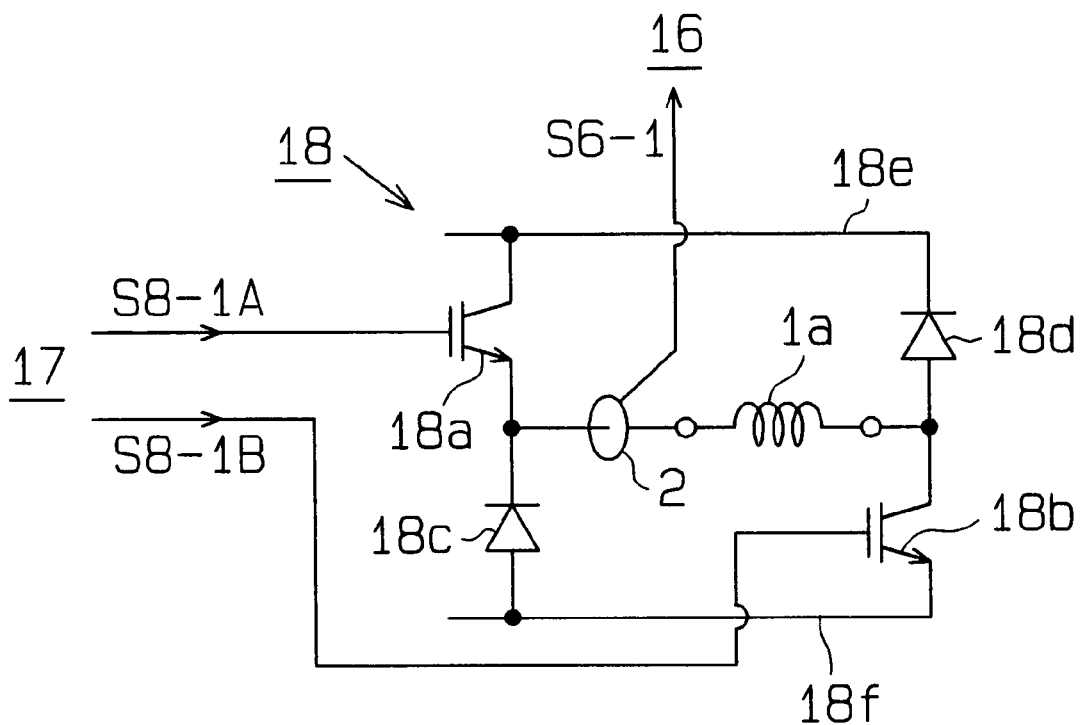
FIG. 2 illustrates an electric circuit of a first phase drive 18 shown in FIG. 1.

FIG. 2 illustrates a specific structure of the main or principal part of the circuit depicted in FIG. 1. Although in FIG. 2 only a circuit for controlling energization of the phase coil 1a of the SR motor 1 is illustrated, the controller ECU also includes same circuits for controlling energization of each of other phase coils 1b and 1c.

As shown in FIG. 2, the driver 18 serves for energizing the phase coil 1a for a first phase of the 3-phase SR motor 1. One end of the phase coil 1a is connected to a high potential line 18e of a power source via an insulated gate bipolar transistor (IGBT) 18a, while the other end of the phase coil 1a is connected to a lower potential line 18f of the power source via an insulated gate bipolar transistor (IGBT) 18b. A diode 18c is connected between an emitter of the transistor 18a and the lower potential line 18f, a diode 18d is connected between a collector of the transistor 18b and the high potential line 18e. Thus, if the transistors 18a and 18b are turned on simultaneously, an electric current flows through the phase coil 1a. The current sensor 2 generates the signal S6-1 which is indicative of the magnitude of the resulting electric current and feeds the signal S6-1 to the comparator circuit 16.

Referring back to FIG. 1, the comparator circuit 16 issues a binary signal or two-value signal S7 which is indicative of a result when a criteria or reference voltage outputted from the current waveform generating circuit 15 is compared to a voltage of the signal S6-1 corresponding to the current detected by the current sensor 2. The output discriminating circuit 17 is designed, in response to the output of the comparator circuit 16, to issue on and off signals to each of the transistors 18a and 18b. The current waveform generating circuit 15 issues the reference voltage and a binary signal or two-value signal S5 on the basis of information stored in a bi-directional memory.

Figure 3:
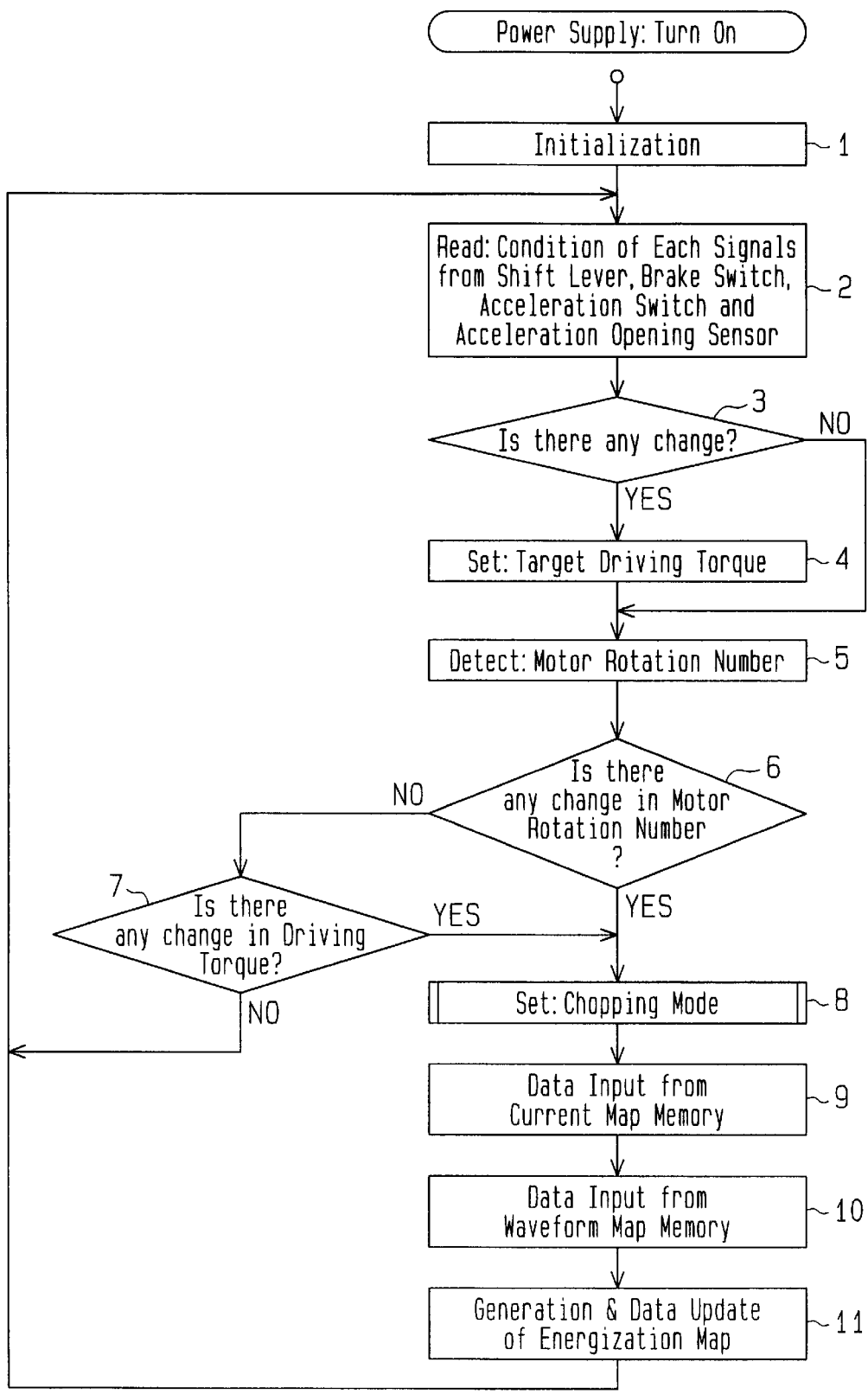
FIG. 3 illustrates a flowchart which shows a program routine of the operation of a CPU 11, shown in FIG. 1, for motor energization control.

Referring now to FIG. 3 which indicates an outline operation of the CPU 11 as a flowchart, when the power supply is turned on, at step (1), an initialization procedure is executed. In detail, the inner memories of the CPU 11 are initialized, modes of an inner timer, an interruption and other functions are set. Thereafter, a system diagnosis is performed. If no errors are found in the system, the control proceeds, next, to next step (2). At step (2), the CPU 11 receives, via the input interface 12, signal conditions from the respective shift lever, the brake switch, the acceleration switch, and the acceleration opening switch and stores such conditions, as they are, in the inner memory. If any one of the signals detected at step (2) changes, the control goes to step (4) from step (3). Otherwise i.e. no change is found, the control proceeds to step (5) from step (3).

At step (4), on the basis of the various conditions detected at step (2), a driving direction of the SR motor 1 and a target driving torque Trq are determined. For example, when the acceleration opening is increased which is detected by the acceleration opening sensor, the value of the target driving torque Trq is also increased. Simultaneously, a torque change flag is set which is indicative of change of the target driving torque Trq.

At step (5), a rotation number Nm of the SR motor 1 is detected. In this embodiment, when the 11 bit binary signal issued from the angle sensor 1d changes which is designed for detecting rotational position or angular position of the rotor, the cyclic period of the angular position change becomes in reverse proportion to the speed of the rotor. Thus, the CPU 11 calculates the rotation number of the SR motor 1 by determining the change in the cyclic period of the lower bits of the signal. The resultant or calculated rotation number Nm of the SR motor 1 is stored in the inner memory.

If a change is detected or found in the rotation number Nm of the SR motor 1, the control or program routine goes to step (8) from step (6). In case of no change in the rotation number Nm of the SR motor 1, the control proceeds to step (7). At step (7), it is checked whether or not the torque change flag is set. If the result is true which indicates that the target driving torque Trq changes, the control goes to step (8). If the result is false i.e. in case where no change is found in the target driving torque Trq, the control returns to step (2).

At step (8), chopping mode is set on the basis of the target driving torque Trq and the rotation number Nm of the SR motor 1. The details or contents of such setting procedure are depicted, as a flowchart, in FIG. 4. Regions of the rotation number Nm of the SR motor 1 and the corresponding set contents are illustrated in FIG. 5. In FIG. 5, the x-axis or horizontal axis indicates the rotation number Nm of the SR motor 1, while the y-axis or vertical axis indicates the target driving torque Trq. Bold arrows constitute a rectangular coordinates system of rotation number axis and target driving torque. In the first quadrant (the upper-right region) of this rectangular coordinates system and the third quadrant (the lower-left region) thereof, the direction of the target driving torque Trq and the rotation direction of the SR motor 1 are identical and while the SR motor 1 is being energized the rotor is being in rotation in the direction of the target driving torque Trq. That is to say, each of the first quadrant (the upper-right region) of this rectangular coordinates system and the third quadrant (the lower-left region) thereof is indicative of powering region in which the SR motor 1 drives the wheels to rotate. Both the first quadrant (the upper-right region) of this rectangular coordinates system and the third quadrant (the lower-left region) thereof indicates regenerating region in which the SR motor 1 is driven by the wheels to rotate.

Figure 4:
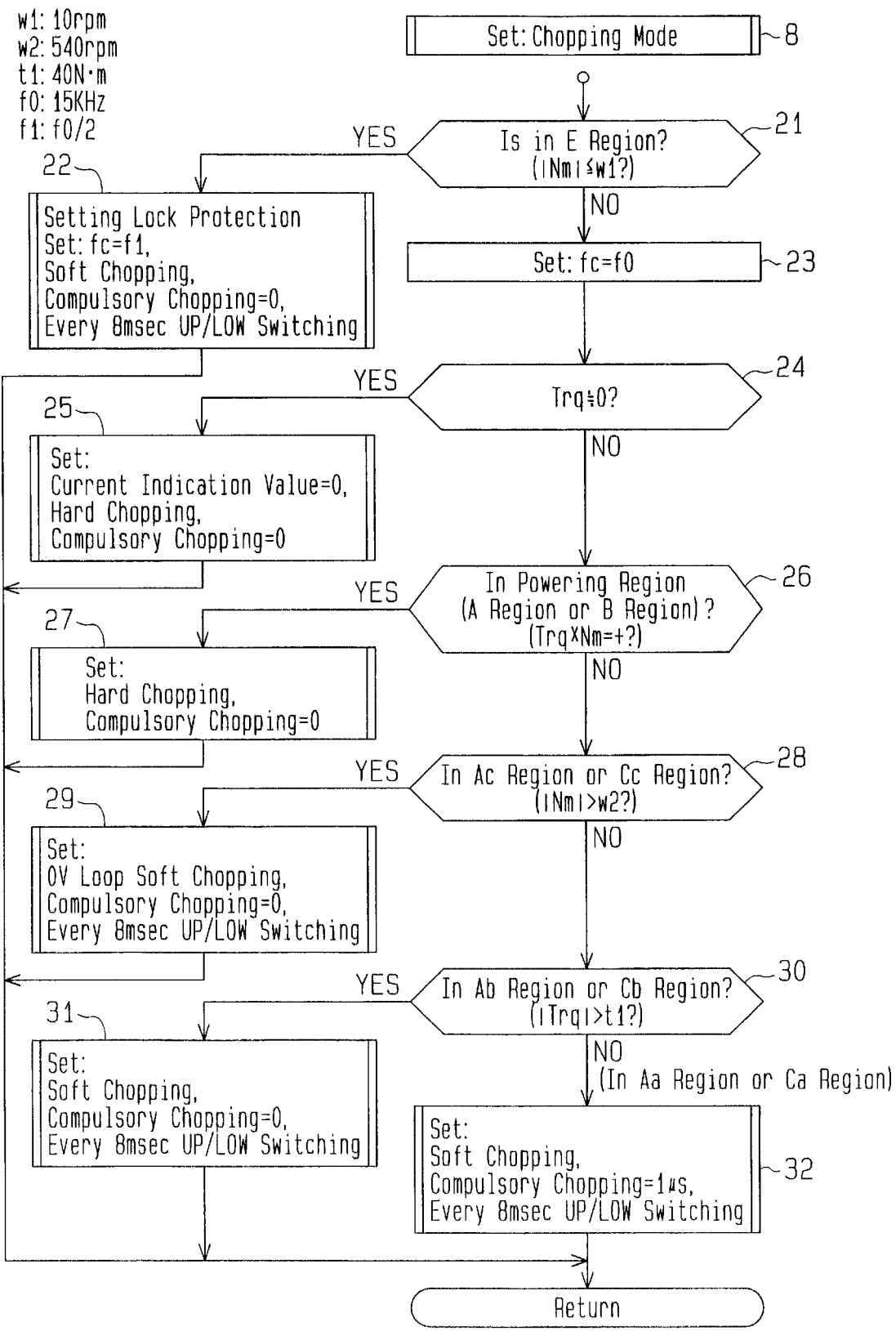
FIG. 4 illustrates a flowchart which shows a program routine as detailed contents of 'setting chopping mode' shown in FIG. 3.
Figure 5:
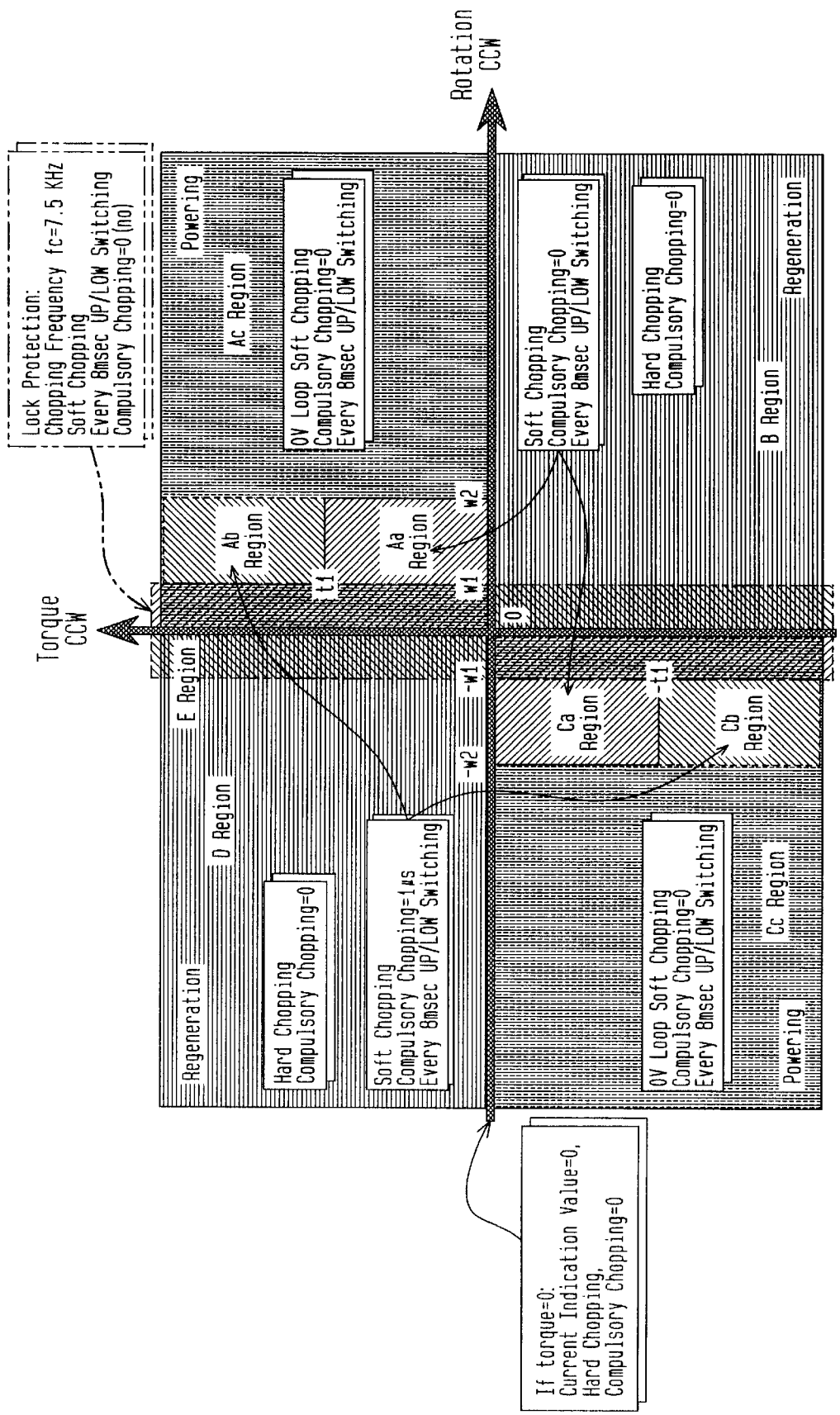
FIG. 5 illustrates a regional distribution of chopping modes on coordinates of target driving torque Trq and rotation number Nm of motor.

Referring to FIG. 4 which depicts the detailed contents of step (8) for setting chopping mode, first of all, at step (21) the CPU 11 checks whether or not the rotation number Nm of the SR motor 1 is within a very low speed E region ($-w1 \leq Nm \leq w1$) in which the absolute value of rotation number Nm is equal to or less than w1 (10 rpm). If the result is true or positive, for the prevention of over-heating of the driver 18, step (22) is executed. It is to be noted similar operations are made with respect to the drivers 19 and 1A, these operations are not detailed for the simplicity of explanation. The details of step (22) are: setting chopping frequency Fc to a lower frequency f1 (=f0/2=7.5 KHz), making the chopping mode 'soft chopping', and setting every 8 msec UP/LOW switching. The 'setting every 8 msec UP/LOW switching' means that at a cycle of 8 msec the roles of the transistors 18a and 18b alternates in such a manner that one of the transistors 18a and 18b is turned on and off alternately, while the other of the transistors 18a and 18b is continually turned off. In other words, after a condition lasts for 8 msec under which the transistor 18a is turned on and off repeatedly, while the transistor 18b is being turned off in unchangeable fashion, a condition continues for 8 msec under which the transistor 18b is turned on and off repeatedly, while the transistor 18a is being turned off in unchangeable fashion. During a condition after termination of the latest mentioned condition, a condition lasts for 8 msec under which the transistor 18a is turned on and of f repeatedly, while the transistor 18b is being turned off in unchangeable fashion. Thus, two different 8 msec continuing condition alternates in repeated fashion is determined. However, it is to be noted that such action is valid while the first phase coil 1a is in its phase energization period for rotating the rotor. Outside of such a period, both the transistors 18a and 18b are turned off.

The phrase 'compulsory chopping=1 μs' which appears in FIGS. 4 and 5 means a soft chopping which reverses the output of the transistor 18a or 18b which is turned on and off repeatedly in such a manner that the reversing is made, while chopping mode, at a cycle of 66 msec, continues for a temporal duration of 1 μsec. The phrase 'compulsory chopping=0' means a soft chopping without such the foregoing reverse of the output or the aforementioned compulsory chopping. Setting 'compulsory chopping=0' means, from the view point of data processing, that a resister (not shown) storing a data which is indicative of specifying 'compulsory chopping' is cleared or the data in this resister is deleted.

If the rotation number Nm of the SR motor 1 falls outside the E region, the chopping frequency is set to be a high frequency of f0 (=f1×2=15 KHz) at step (23) and it is checked whether or not the target driving torque Trq is equal to or close to zero at step (24). If the result is true or positive, at step (25), a current target value is set to be zero and 'hard chopping mode' and 'compulsory chopping=0', are set. The 'hard chopping' means a chopping which causes both of the transistors 18a and 18b to turn on and turn off when the motor current detected by the current sensor 2 is less than the current target value and is equal to or larger than the current target value.

If the result of step (24) is false or negative, the CPU 11 checks, at step (26), whether or not the direction of the target driving torque Trq is in coincidence with the rotation direction of the SR motor 1 i. e. whether or not the SR motor 1 is in powering. If the SR motor 1 is not in powering but in regenerating, 'hard chopping mode' and 'compulsory chopping=0', are set at step (27). If the SR motor 1 is found to be in powering, it is checked, at step (28), whether or not the rotation number Nm of the SR motor 1 falls in either of Ac region or Cc region in which the absolute value of motor rotation number Nm is in excess of w2 (540 rpm). If the result is true or positive, at step (29), '0V loop soft chopping', 'compulsory chopping=0', and 'every 8 msec UP/LOW switching' are set. If the rotation number Nm of the SR motor 1 falls in a region which is within 'powering' area and which is neither Ac region nor Cc region, at step (30), it is checked whether or not the target driving torque fall in either of Ab region and Cb region in which target driving torque Trq is in excess of t1. If the result is true or positive, at step (31), 'soft chopping', 'compulsory chopping=0', and 'every 8 msec UP/LOW switching' are set. If the result of step 30 which indicative that the rotation number Nm of the SR motor 1 falls in either Aa region or Ca region, 'soft chopping', 'compulsory chopping=1 μm', and 'every 8 msec UP/LOW switching' are set.

Referring back to FIG. 3, immediately upon completion of step (8) which establishes setting chopping mode, the CPU 11 reads data from the current map memory 13*a* which is in the form of ROM at step (9) and subsequently at step (10) reads data from the current waveform map memory 13*b* which is also in the form of ROM. In this embodiment, the current map memory 13*a* stores therein a plurality of phase energization control data sets. The data sets are related to the corresponding addresses which are defined by the target driving torque and the rotation number Nm. Each data set includes current target value and information defining a time duration during which the first phase coil 1*a* is being energized. Such information includes an energization-on angle which means angular position of the rotor when energization is initiated and energization-off angle which means angular position of the rotor when energization is terminated. The waveform map memory 13*b* stores the raising advance angle and falling advance angle which are directed to each of the addresses in order to smooth the raising edge and falling edge of the energization current, respectively.

In detail, the current map memory 13*a* is formed into a matrix structure in which the foregoing stored data set is in general represented as Cnm where n and m are a value of row corresponding to target driving torque and value of column corresponding to motor rotation number, respectively. The data set represented by Cnm includes the energization-on angle, energization-off angle, and current target value. For example, the contents of the data set which is represented as C34 when the target driving torque and the motor rotation number are 20 [N·m] and 500 [rpm], respectively, are 52.5 degrees, 82.5 degrees, and 200 amperes. That is to say, so long as the angular position of the rotor is between 0 to 90 degrees, 200 A current is flown through the specific phase coil when the angular position of the rotor is between 52.5 and 82.5 degrees. while when the angular position of the rotor is between 0 and 52.5 degrees or between 82.5 and 90 degrees, no current is flown through the specific phase coil. At step (9), the data set Cnm is read which is selected by the most recent target driving torque and the most recent rotation number Nm.

However, it is to be noted that the target value of current to be flown through the phase coil does not change in rectangular pulse mode but changes in wave mode whose raising and falling edges are gentle. This waveform is determined or depends on the contents of the waveform map memory 13*b*.

In the waveform memory 13*b*, various data are stored each of which are corresponded to various rotation numbers are resented by D1n and D2n, respectively, in general, where n means value of row corresponding to rotation number. The data D1n which is indicative of a required raising angle denotes an angular change when the current is raised from low level (0 [A]) to high level (e.g. 200 [A]). The data D2n which is indicative of a required falling angle denotes an angular change when the current is fallen from high level (e.g. 200 [A]) to low level (0 [A]).

For example, in case where the foregoing data C34 in the current map 13*a* is used, the waveform of the target current is changed in such a manner that the raising target current value is initiated when the rotor takes an angular position which is smaller than the energization-on angle or 52.5 degrees by an angle of D1n so that the target current can be raised fully at an angle of 52.5 degrees in gradual fashion. The waveform of the target current is also changed in such a manner that the falling target current value is initiated when the rotor takes an angular position which is smaller than the energization-off angle or 82.5 degrees by an angle of D2n so that the target current can be fallen fully at an angle of 82.5 degrees in gradual fashion The data D1n and D2n in the waveform map memory 13*b* are determined so that the current raising and current falling can be made at suitable time (or suitable angular position of the rotor) for every motor rotation number Nm [rpm]. In detail, if raising current and falling current are initiated too early, the differential value of magnetic flux when switching the energization becomes large, thereby increasing vibration and noise, while if raising current and falling current are initiated too late, the driving torque drops considerably, thereby lowering driving efficiency. Thus, the data D1n and D2n are determined so that vibrations and noise are restricted and the loss of driving efficiency becomes as small as possible. In addition, especially, raising time and falling time which correspond to the data D1n and D2n, respectively, are set to be larger than the half cycle of the proper or natural frequency (resonant frequency) of the SR motor 1, which makes it possible to lower the frequency of vibration when switching the energization than the natural frequency of the SR motor 1, with the result that the resonant is prevented, thereby restricting the increasing of the level in each vibration and noise.

At step (10), depending on the most recent motor rotation number Nm, a set of data D1n and D2n is selected from the waveform memory map 13*b* so as to be inputted to the CPU 11. For example, if the motor rotation number Nm is 500 [rpm], the data D14 and D24 are selected for being inputted to the CPU 11.

Next, at step (11), on the basis of the data Cnm inputted at step (9) and data D1n and D2n both of which are inputted at step (10), an energization map which establishes the smooth rising and falling of the target current is generated. The energization map which is in the form of the latest version updates or rewrite the bi-directional data in the current waveform generating circuit. Of course, with respect to other phases, similar updates are made, respectively.

The CPU 11 executes the aforementioned steps (2) through (11) in repetitious fashion. If the calculated target driving torque Trq and the detected motor rotation number Nm are constant or invariable the program routine executes the steps 6, 7, and 2 in such an order. However, if at least one of the motor rotation number Nm and the target driving torque changes or varies, the steps 8, 9, 10, and 11 are executed in such an order, thereby updating the bi-directional memory in the current waveform generating circuit 15.

The invention has thus been shown and described with reference to a specific embodiment, however, it should be understood that the invention is in no way limited to the details of the illustrates structures but changes and modifications may be made without departing from the scope of the appended claims.

What is claimed is:

1. A chopping energization control device comprising:
    first switching means interposed between one end of an electric coil of an electric motor and one terminal of a power supply;
    second switching means interposed between the other end of the electric coil and the other terminal of the power supply;

signal generation means for generating an energization indication signal which makes the first switching means and the second switching means conductive in order to establish a chopping energization of the electric coil at a frequency on the basis of a target driving torque and a motor speed value of the electric motor; and control means for reducing the chopping frequency while the motor speed value of the electric motor is equal to or less than a predetermined value so that the chopping frequency while the motor speed value is equal to or less than the predetermined value is lower than the chopping frequency while the motor speed value is greater than the predetermined value.

2. The chopping energization control device as set forth in claim 1, wherein the control means, while the electric motor is in regenerating mode under which a polarity of the target torque value and a rotational direction of the electric motor differs, the electric coil is controlled in hard chopping mode in such a manner that if a value of current detected by a current sensor is equal to or less than or is greater than a target current value corresponding to the target driving torque, both of the first switching means and the second switching means are concurrently turned on and off, respectively.

3. The chopping energization control device as set forth in claim 1, wherein the electric motor is an SR motor (Switched Reluctance Motor).

4. The chopping energization control device as set forth in claim 3, wherein the SR motor is for an electric powered vehicle.

5. A chopping energization control device comprising:

first switching means interposed between one end of an electric coil of an electric motor and one terminal of a power supply;

second switching means interposed between the other end of the electric coil and the other terminal of the power supply;

signal generation means for generating an energization indication signal which makes the first switching means and the second switching means conductive in order to establish a chopping energization of the electric coil on the basis of a target driving torque and a motor speed value of the electric motor;

a current sensor for detecting an amount of current which flows through the electric coil; and control means for controlling the electric coil in a soft chopping mode or in a compulsory soft chopping mode if the target driving torque becomes larger than a predetermined value or becomes equal to or smaller than the predetermined value, respectively, while the electric coil is in its energization period, the soft chopping mode making one of the first switching means and the second switching means turned-on when the amount of current detected by the current sensor is equal to or less than a target current value corresponding to the target driving torque, and making the one switching means turned-off when the amount of current detected by the current sensor is greater than the target current value corresponding to the target driving torque, while the soft chopping mode making the other switching means turned-on in continual fashion, the compulsory soft chopping mode alternating turn-on and turn-off of one of the first switching means and the second switching means in compulsory fashion each time a constant period elapses, while making the other switching means turned-on in continual fashion.

6. The chopping energization control device as set forth in claim 5, wherein the control means, while the electric motor is in regenerating mode under which a polarity of the target torque value and a rotational direction of the electric motor differs, the electric coil is controlled in hard chopping mode in such a manner that if the value of current detected by the current sensor is equal to or less than or is greater than the target current value corresponding to the target driving torque, both of the first switching means and the second switching means are concurrently turned on and off, respectively.

7. The chopping energization control device as set forth in claim 5, wherein if the motor speed valve of the electric motor is a value which is equal to or smaller than a set value or is greater than a set value, the control means makes a frequency low and high, respectively.

8. The chopping energization control device as set forth in claim 5, wherein, periodically the first switching means is replaced with the second switching means so as to be turned on and off in alternate fashion while the second switching means is replaced with the first switching means so as to be turned on in continual fashion and, alternately, the second switching means is periodically replaced with the first switching means so as to be turned on and off in alternate fashion while the first switching means is replaced with the second switching means so as to be turned on in continual fashion.

9. A chopping energization control device comprising:

first switching means interposed between one end of an electric coil of an electric motor and one terminal of a power supply;

second switching means interposed between the other end of the electric coil and the other terminal of the power supply;

signal generation means for generating an energization indication signal which makes the first switching means and the second switching means conductive in order to establish a chopping energization of the electric coil on the basis of a target driving torque and a motor speed value of the electric motor;

a current sensor for detecting an amount of current which flows through the electric coil; and control means for controlling the electric coil in soft chopping mode or in 0V loop soft chopping mode if the motor speed value of the electric motor is equal to or less than a predetermined value, respectively, while the electric coil is in its energization period, the soft chopping mode making one of the first switching means and the second switching means turned-on when the amount of current detected by the current sensor is equal to or less than a target current value corresponding to the target driving torque, and making the one switching means turned-off when the amount of current detected by the current sensor is greater than the target current value corresponding to the target driving torque, while the soft chopping mode making the other switching means turned-on in continual fashion, the 0V loop soft chopping mode making one of the first switching means and the second switching means turned-on when the amount of current detected by the current sensor is equal to or less than a target current value corresponding to the target driving torque, and making the one switching means turned-off when the amount of current detected by the current sensor is greater than the target current value corresponding to the target driving torque, and furthermore making the one switching means turned-off in compulsory fashion from a predetermined short time before the termination of the energization period of the electric coil to the termination of the energization period, while the 0V loop soft chopping mode making the other switching means turned-on in continual fashion.

10. The chopping energization control device as set forth in claim 9, wherein the control means, while the electric motor is in regenerating mode under which a polarity of the target torque value and a rotational direction of the electric motor differs, the electric coil is controlled in hard chopping mode in such a manner that if the value of current detected by the current sensor is equal to or less than or is greater than the target current value corresponding to the target driving torque, both of the first switching means and the second switching means are concurrently turned on and off, respectively.

11. The chopping energization control device as set forth in claim 9, wherein if the motor speed value of the electric motor is a value which is equal to or smaller than a set value or is greater than a set value, the control means makes a frequency low and high, respectively.

12. The chopping energization control device as set forth in claim 9, wherein, periodically, the first switching means is replaced with the second switching means so as to be turned on and off in alternate fashion while the second switching means is replaced with the first switching means so as to be turned on in continual fashion and, alternately, the second switching means is periodically replaced with the first switching means so as to be turned on and off in alternate fashion while the first switching means is replaced with the second switching means so as to be turned on in continual fashion.

13. A chopping energization control device comprising:
   first switching means interposed between one end of an electric coil of an electric motor and one terminal of a power supply;
   second switching means interposed between the other end of the electric coil and the other terminal of the power supply;
   signal generation means for generating an energization indication signal which makes the first switching means and the second switching means conductive in order to establish a chopping energization of the electric coil at a frequency on the basis of a target driving torque and a motor speed value of the electric motor;
   a current sensor for detecting an amount of current which flows through the electric coil; and
   control means for controlling the electric coil in soft chopping mode if the target driving torque becomes larger than a predetermined value and if the motor speed value of the electric motor is equal to or less than a set value while the electric coil is in its energization period, for controlling the electric coil in compulsory soft chopping mode if the target driving torque becomes equal to or smaller than the predetermined value while the electric coil is in its energization period, and for controlling the electric coil in 0V loop soft chopping mode if the motor speed value of the electric motor is greater than the set value while the electric coil is in its energization period, the soft chopping mode making one of the first switching means and the second switching means turned-on when the amount of current detected by the current sensor is equal to or less than a target current value corresponding to the target driving torque, and making the one switching means turned-off when the amount of current detected by the current sensor is greater than the target current value corresponding to the target driving torque, while the soft chopping mode making the other switching means turned-on in continual fashion, the compulsory soft chopping mode alternating turn-on and turn-off of one of the first switching means and the second switching means in compulsory fashion each time a constant period elapses, while making the other switching means turned-on in continual fashion, the 0V loop soft chopping mode making one of the first switching means and the second switching means turned-on when the amount of current detected by the current sensor is equal to or less than the target current value corresponding to the target driving torque, and making the one switching means turned-off when the amount of current detected by the current sensor is greater than the target current value corresponding to the target driving torque, and furthermore making the one switching means turned-off in compulsory fashion from a predetermined short time before the termination of the energization period of the electric coil to the termination of the energization period, while the 0V loop soft chopping mode making the other switching means turned-on in continual fashion.

14. The chopping energization control device as set forth in claim 13, wherein the control means, while the electric motor is in regenerating mode under which a polarity of the target torque value and a rotational direction of the electric motor differs, the electric coil is controlled in hard chopping mode in such a manner that if the value of current detected by the current sensor is equal to or less than or is greater than the target current value corresponding to the target driving torque, both of the first switching means and the second switching means are concurrently turned on and off, respectively.

15. The chopping energization control device as set forth in claim 13, wherein if the rotation number of the electric motor is a value which is equal to smaller than the set value and is greater than the set value, the control means makes the frequency low and high, respectively.

16. The chopping energization control device as set forth in claim 13, wherein, periodically, the first switching means is replaced with the second switching means so as to be turned on and off in alternate fashion while the second switching means is replaced with the first switching means so as to be turned on in continual fashion and, alternately, the second switching means is periodically replaced with the first switching means so as to be turned on and off in alternate fashion while the first switching means is replaced with the second switching means so as to be turned on in continual fashion.

* * * * *